United States Patent [19]
Merkin et al.

[11] Patent Number: 5,509,120
[45] Date of Patent: Apr. 16, 1996

[54] METHOD AND SYSTEM FOR DETECTING COMPUTER VIRUSES DURING POWER ON SELF TEST

[75] Inventors: Stanley L. Merkin, Lake Worth; Bharat Khatri, Boca Raton, both of Fla.

[73] Assignee: International Business Machines Corporation, Armonk, N.Y.

[21] Appl. No.: 159,273

[22] Filed: Nov. 30, 1993

[51] Int. Cl.⁶ .................................................. G06F 11/00
[52] U.S. Cl. ................. 395/186; 395/183.22; 364/286.4; 364/286.5; 380/4; 380/23; 380/25
[58] Field of Search ............................. 395/575, 183.14, 395/183.22, 186, 187.01, 188.01; 371/10.1, 19, 21.1, 22.4, 25.1; 380/4, 23, 25, 49, 50; 340/825.31, 825.34; 364/550, 231, 236.2, 238.4, 957.1, 286.4, 286.5

[56] References Cited

U.S. PATENT DOCUMENTS

| | | | |
|---|---|---|---|
| 4,975,950 | 12/1990 | Lentz | 380/4 |
| 5,121,345 | 6/1992 | Lentz | 395/575 |
| 5,144,659 | 9/1992 | Jones | 380/4 |
| 5,210,795 | 5/1993 | Lipner et al. | 380/23 |
| 5,265,163 | 11/1993 | Golding et al. | 380/25 |
| 5,276,735 | 1/1994 | Boebert et al. | 380/21 |
| 5,278,901 | 1/1994 | Shieh et al. | 380/4 |
| 5,289,540 | 2/1994 | Jones | 380/23 |
| 5,311,591 | 5/1994 | Fischer | 380/4 |
| 5,313,639 | 5/1994 | Chao | 395/725 |
| 5,319,776 | 6/1994 | Hile et al. | 395/575 |
| 5,349,655 | 9/1994 | Mann | 395/575 |

OTHER PUBLICATIONS

Edward Wilding, Fixed disk boot sectors and post-attack recovery, Jul. 1991, Virus Bulletin (JP) pp. 5-9.
ViruSafe, version 4.01, XTree Co., 1991.
Katz, William F.; Chips chomp life out of boot-sector viruses; Oct. 24, 1994; PC Week, vol. VII, Issue: n42, p. N1(2).
Intel, McAjee offer solid hardware-based virus detection schemes.

*Primary Examiner*—Robert W. Beausoliel, Jr.
*Assistant Examiner*—Dieu-Minh Le
*Attorney, Agent, or Firm*—George E. Grosser

[57] ABSTRACT

A computer system includes a system processor, an information storage apparatus, at least one booting device from which the computer system can be booted, and a detection apparatus for detecting a computer virus during a boot sequence for the computer system. The information storage apparatus contains information including cyclic redundancy check values for a Master Boot Record and for an operating system selected for booting. These CRC values are computed when the Master boot record and the operating system boot record are known to be free from computer viruses. The detection apparatus comprises: (1) apparatus for reading the master boot record and operating system boot record from the selected booting device; (3) apparatus for determining whether the boot records are valid; (4) apparatus for passing control of the CPU to the boot record of the device when it is determined that the boot record of the device is valid and for presenting a message to a user indicating that the boot record of the device is not valid, in the event that the boot record of the device is not valid.

11 Claims, 5 Drawing Sheets

METHOD AND SYSTEM FOR DETECTING COMPUTER VIRUSES DURING POWER ON SELF TEST

FIELD OF THE INVENTION

This invention relates to personal computer systems and in particular to a method and system for detecting computer viruses during the power-on self test.

BACKGROUND OF THE INVENTION

Personal computer systems in general and IBM® personal computers in particular have attained widespread use for providing computer power to many segments of today's modern society. Personal computer systems can usually be defined as a desk top, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard (or system planar) to electrically connect these components together. These systems are designed primarily to give independent computing power to a single user and are inexpensively priced for purchase by individuals or small businesses.

Beginning with the earliest personal computer, such as the IBM Personal Computer, it was recognized that software compatibility would be of utmost importance. In order to achieve this goal, an insulation layer of system resident code, also known as "firmware", was established between the hardware and software. This firmware provided an operational interface between a user's application program/operating system and the hardware device to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board. Newer versions of BIOS are stored both in ROM and in EEPROM or in the hard drive.

A problem encountered by many personal computer users is the inadvertent introduction of so-called computer viruses into the computer system. Computer viruses are programs that generally are able to make copies of themselves and are capable of affecting the operation of the subject computer system. These computer viruses can cause unrecoverable errors and can have large economic impact. There are several virus detection programs available to scan for a virus on the computer.

Normally, a computer's power-on self test (POST) would run to completion, then read in the Master Boot Record (MBR) off the booting device (usually a disk), and pass control to that device. The MBR loads the operating system boot record which then loads the rest of the operating system. A computer virus author may design the virus so that it gets into the MBR or the operating system boot record. This creates the opportunity for a virus to acquire control of the system before the operating system has a chance to load and run any virus detection program.

SUMMARY OF THE INVENTION

Briefly, in accordance with the invention, a computer system comprises a system processor, non-volatile storage means, and detection means for detecting a computer virus during a boot sequence. The non-volatile storage means includes an ID for a selected booting device. The detection means comprises: (1) means for reading a master boot record from the selected booting device; (2) means for determining whether the master boot record is valid; and (3) means for passing control of the computer system to the master boot record of the selected booting device when that boot record is valid.

In accordance with another aspect of the invention a method for detecting computer viruses during boot includes the steps of:

(a) storing an identification code in the information storage device, the identification code corresponding to a selected booting device, the selected booting device including a master boot record;

(b) reading the master boot record and the operating system boot record from the booting device;

(c) determining whether the master boot record and the operating system boot record are valid; and (d) passing control of the CPU to the boot record of the booting device when it is determined that the master boot record and the operating system boot record are valid.

DESCRIPTION OF THE ILLUSTRATIVE EMBODIMENT

While the present invention will be described more fully hereinafter with reference to the accompanying drawings, in which a preferred embodiment of the present invention is shown, it is to be understood at the outset of the description that follows that persons of skill in the appropriate arts may modify the invention here described while still achieving the favorable results of this invention. Accordingly, the description which follows is not to be taken in a limiting sense but is made merely for the purpose of illustrating the general principles of the invention since the scope of the invention is best defined by the appending claims.

Figure 1:
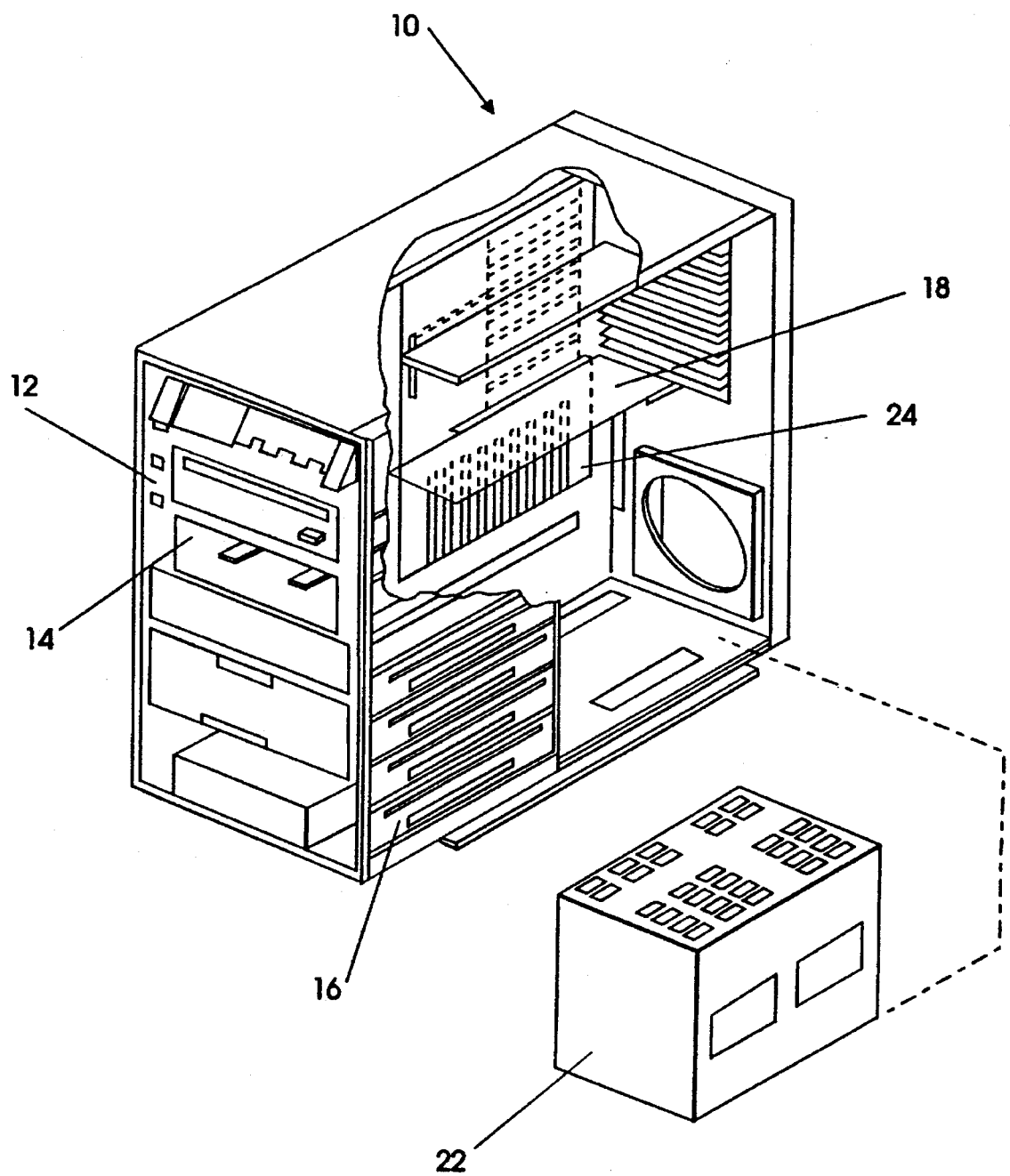
FIG. 1 illustrates a cut away view of a personal computer system including apparatus for preventing loading of a virus during system boot in accordance with the present invention.

Referring now to FIG. 1, there is shown a cutaway version of a personal computer system 10, having a plurality of DASD (Direct Access Storage Devices) 12–16 connected to a system or planar board 24 through a plurality of I/O slots 18. A power supply 22 provides electrical power to the system 10 in a manner that is well known. The planar board (i.e., motherboard) 24 includes a system central processor unit (CPU) 26 which operates under the control of computer instructions to input, process, and output information.

In use, the personal computer system 10 is designed primarily to give independent computing power to a small group of users or a single user and is inexpensively priced for purchase by individuals or small businesses. In operation, the system processor operates under an operating system, such as IBM's OS/2® Operating System or DOS. This type of operating system includes a BIOS interface between the DASD 12–16 and the Operating System. A portion of BIOS divided into modules by function is stored in ROM on the planar 24 and hereinafter will be referred to as ROM-BIOS. BIOS provides an interface between the hardware and the operating system software to enable a programmer or user to program their machines without an indepth operating knowledge of a particular device. For example, a BIOS diskette module permits a programmer to program the diskette drive without an indepth knowledge of the diskette drive hardware. Thus, a number of diskette drives designed and manufactured by different companies can be used in the system. This not only lowers the cost of the system 10, but permits a user to choose from a number of diskette drives.

Figure 2:
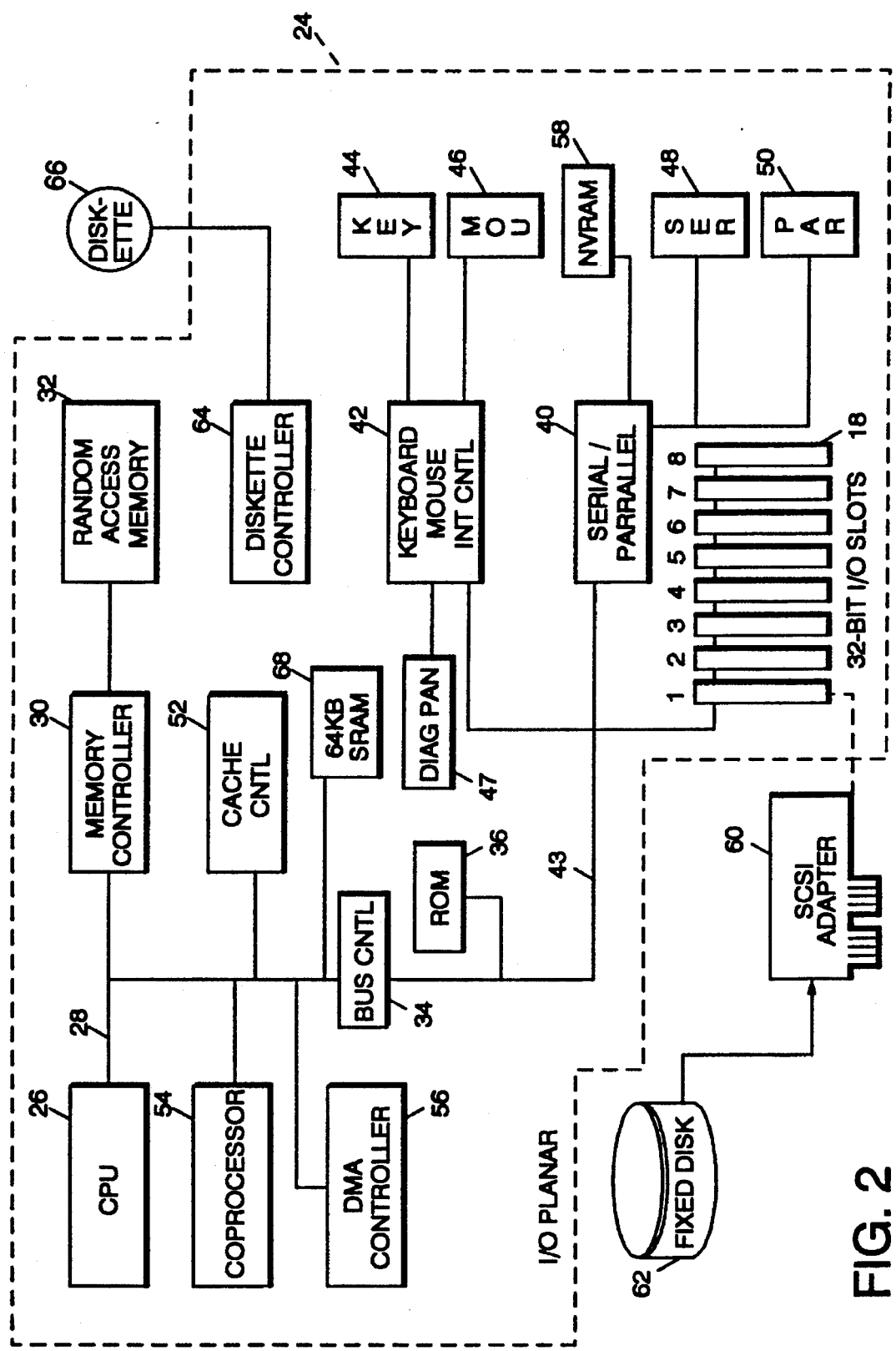
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10 in accordance with the present invention, including components mounted on the planar 24 and the connection of the planar to the I/O slots and other hardware of the personal computer system. Accordingly, FIG. 2 illustrates components of the planar 24 and the connection of the planar 24 to the I/O slots 18–1 to 18–8, into which I/O options cards (not shown) may be interchangeably plugged, and other hardware of the personal computer system. These cards control various types of peripheral devices (disk drives, printers, etc.) and add-on memory which are either integrally contained on respective cards or attached thereto via external connectors.

Located on the planar 24 is the primary system processor 26 which comprises of a microprocessor which is connected by a local bus 28 to a memory controller 30 which is further connected to a random access memory (RAM) 32. While any appropriate microprocessor can be used, suitable microprocessors include the 80386 or 80486 which are sold by Intel. The local bus 28 is further connected through a bus interface controller (BIC) 34 to a read only memory (ROM) 36 on the planar 24. In this case the ROM 36 includes an electrically erasable programmable read only memory (EEPROM). The bus interface controller 34 serves a number of functions including detection of an alternate processor and transfer of control to that processor.

While the present invention is described hereinafter with particular reference to the system block diagram of FIG. 2, it is to be understood at the outset of the description which follows, it is contemplated that the apparatus and methods in accordance with the present invention may be used with other hardware configurations of the motherboard.

When the computer system is powered up control of the system lies in the microprocessor itself while it runs diagnostic tests on itself. Control of the system then passes to the POST which performs well known diagnostic tests on other components in the system (mostly on the system memory). Control of the system next passes to the master boot record on the device from which booting is to take place. The POST will generally first look to the floppy diskette drive 68 for a bootable diskette, and then to the first fixed disk drive 62, if no bootable diskette is in the diskette drive 8. In the case that the system control is passed to the MBR of fixed disk drive 62, the MBR loads part of the operating system and control of the system then passes to the operating system.

Figure 3:
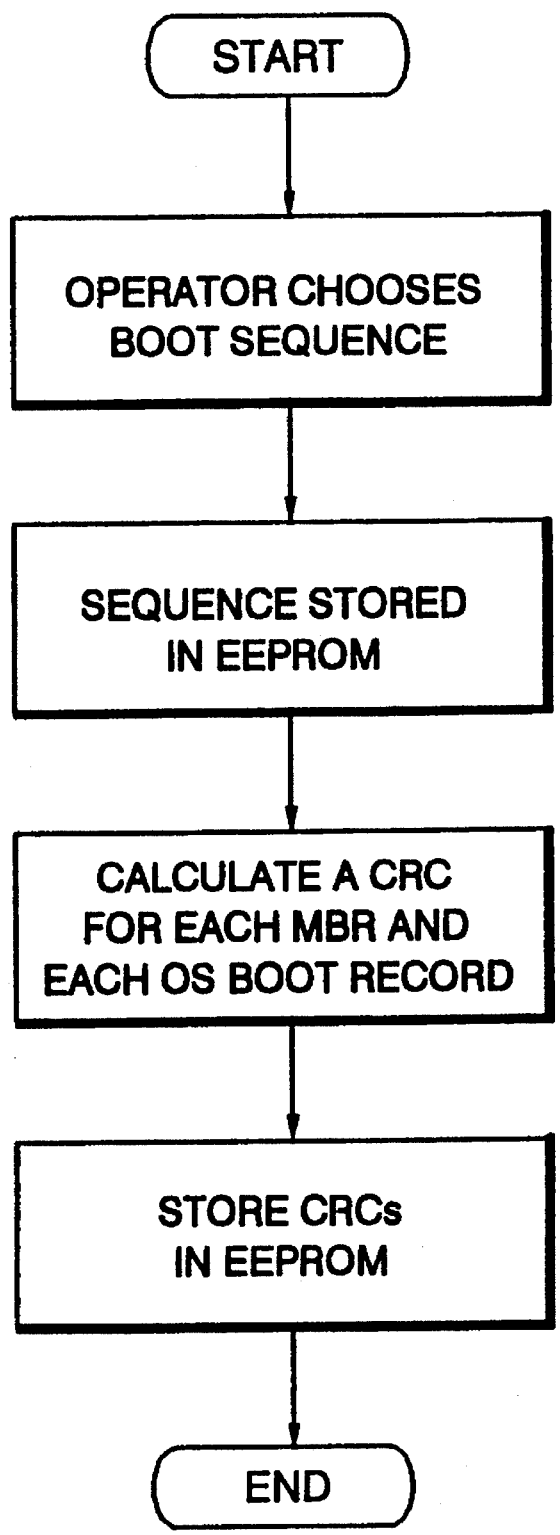
FIG. 3 shows a flow chart of a method for setting up the cyclic redundancy checks (CRCs) and boot sequence.

FIG. 3 shows the sequence of a virus detection method in accordance with the invention. To detect a virus in a system, the system must be controlled to boot from the specified boot sequence. The boot sequence must be controlled and is made accessible by a privileged password. The IBM PS/2 systems have this feature available in some systems. The boot sequence is stored in the EEPROM 36. This area of the memory is write-protected when booting without a privileged access password.

IBM PS/2 systems include a utility program called the Selectable Boot Utility (SBU) which stores in the EEPROM 36 the device ID (i.e., an identification code) corresponding to the device (the fixed disk drive 62, in this case) from which boot will occur. The user may specify up to four devices to attempt to boot from. The POST routines, after running all system diagnostics will read in the MBR from the fixed disk 62 and if a valid master boot is found, the control is passed to it. If the first device is not functioning or is not bootable (i.e., it has no valid MBR or operating system boot record) an attempt is made to boot from the next device in the list.

In accordance with one embodiment of the invention, the SBU is modified to compute a cyclic redundancy check (CRC) of the MBR (sector 1) and of the operating system boot record. This is done at a time when it is known that neither the MBR nor the operating system boot record are contaminated with a computer virus. The SBU stores the CRC in a non-volatile memory such as the EEPROM 36 along with the device boot sequence. This "uncontaminated" CRC could also be stored in other forms of non-volatile memory, such as a fixed disk or NVRAM). This will also require the SBU to be run anytime a new operating system is installed or an FDISK type program is run.

Figure 4A:
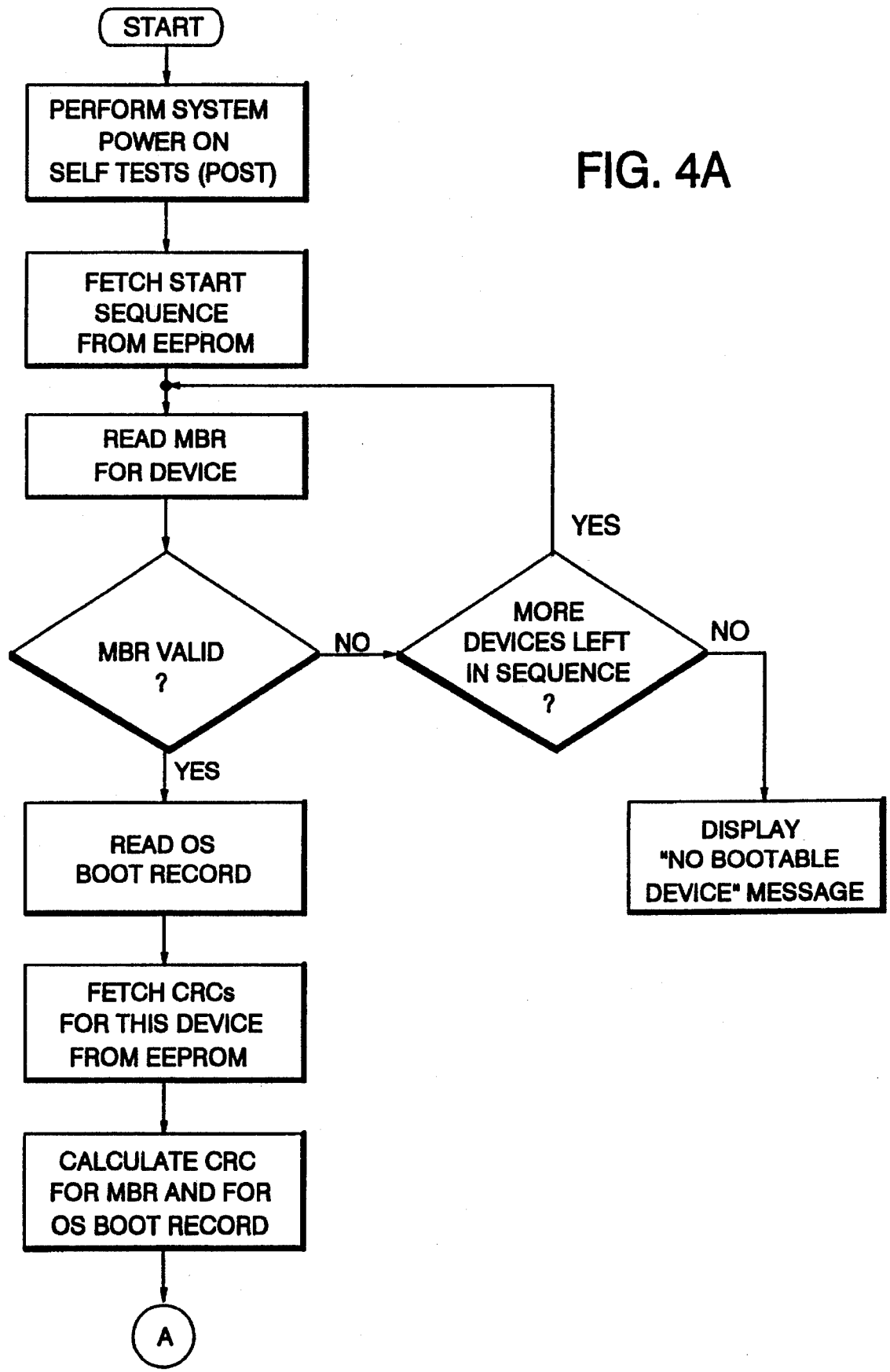
FIG. 4A–4B are flow chart of method for checking the validity of a master boot record and operating system boot record.
Figure 4B:
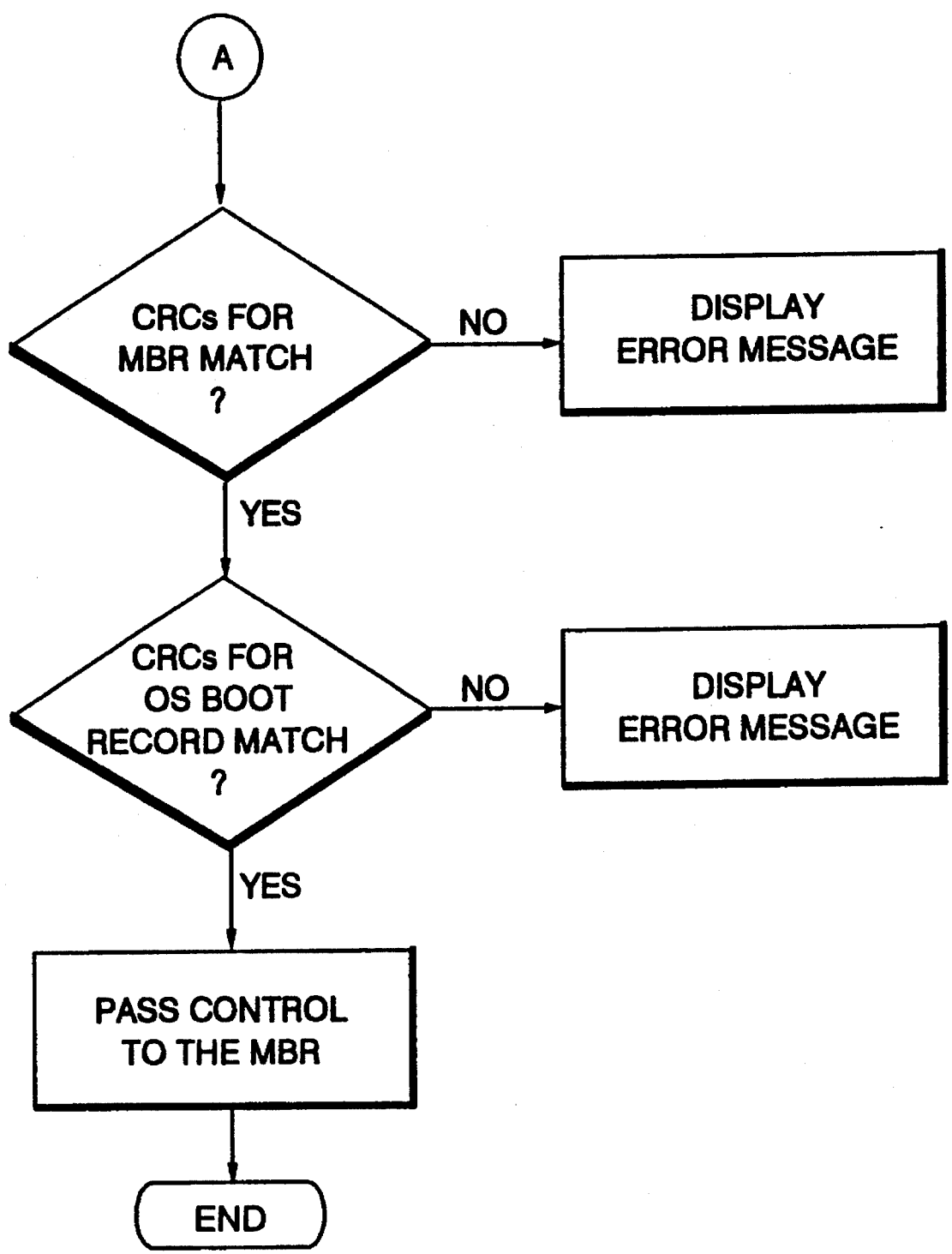

Also in accordance with the invention, the POST is modified to check for validity of the operating system boot record by computing the CRC on the master and operating system boot records and then comparing these CRCs with the CRCs stored in the EEPROM. If these CRCs do not match, POST will display an error message on a monitor screen (for example) to alert the user of possible computer virus contamination of the system. FIG. 4 is a flow chart illustrating a method for checking the validity of a master boot record and operating system boot record.

While the invention has been illustrated in connection with a preferred embodiment, it should be understood that many variations will occur to those of ordinary skill in the art, and that the scope of the invention is defined only by the claims appended hereto and equivalent.

What is claimed is:

1. A computer system comprising a system processor for executing at least one operating system, said at least one operating system having an operating system boot record associated therewith; first non-volatile information storage means, coupled to the system processor, for storing information including identification data for identifying a selected storage device from which the computer system is to boot; and detection apparatus for detecting a computer virus during a power on self test, said detection apparatus comprising:

means, activated during power on self test, for reading a master boot record from the selected storage device specified in the information storage means;

means, coupled to the means for reading, for determining whether the master boot record of the selected storage device is valid in accordance with at least one predetermined criterion, and for indicating the validity of the master boot record; and means responsive to the determining means for selectively passing control of the computer system to the master boot record if the master boot record is valid and for presenting a message to a user indicating that the master boot record is not valid, in the event that the master boot record is not valid, whereby the user is warned of a corrupted master boot record prior to execution thereof.

2. The computer system of claim 1 further comprising:

at least one bootable device, each bootable device having a master boot record associated therewith;

second non-volatile information storage means for storing information including a selected boot sequence, and a first cyclic redundancy check (CRC) value for each master boot record of each bootable device in a predetermined set of bootable devices, and for each operating system boot record of a predetermined set of operating systems, each first CRC value having been computed at a time when neither the master boot records nor the operating system boot records were contaminated with any computer virus;

means for reading a master boot record from a selected bootable device and for reading an operating system boot record from a selected operating system for booting the computer system;

means for checking the validity of the master boot record of the selected bootable device and of the operating system boot record, comprising:
  check means for computing, during the boot sequence, a second CRC value for the operating system boot record of the selected operating system and for the master boot record of the selected bootable device;
  comparing means for comparing each second CRC value with each corresponding first CRC value; and means for passing control of the computer system to the master boot record of the selected bootable device, when the first and second CRC values of the master boot record match, and when the first and second CRC values for the selected operating system match.

3. The computer system of claim 2 further comprising:

means for presenting an indication of virus detection to a user when the first and second CRC values of the master boot record do not match, or when the first and second CRC values for the selected operating system do not match.

4. In computer system having a system processor for executing an operating system, the operating system having a boot record associated therewith, a non-volatile memory, and a user interface with means for communicating messages to the user, a computer subsystem, for detecting a computer virus during a boot sequence, comprising:

selectable boot means for storing an identification code in the non-volatile memory, the identification code corresponding to a bootable device, the bootable device having a master boot record associated therewith;

means, activated during the boot sequence and coupled to the selectable boot means, for reading a boot record from the bootable device;

means, coupled to the means for reading, for determining whether the boot record is valid in accordance with at least one predetermined criterion;

means, coupled to the means for determining, for passing control of the system processor to the boot record of the bootable device only when it is determined that the master boot record of the bootable device is valid and the operating system boot record is valid, and for presenting a message to a user indicating that the boot record of the bootable device is not valid, in the event that the boot record of the bootable device is not valid.

5. The computer system of claim 4 further comprising:

means for computing a first cyclic redundancy check value of the master boot record and the boot record for the selected operating system, at a time when the master boot record has not been contaminated with a computer virus;

non-volatile storage means for storing the first cyclic redundancy check values;

means for computing a second cyclic redundancy check value for the master boot record and for the boot record of an operating system in a selected bootable device for booting the computer system;

means for validating the second cyclic redundancy check values; and means for passing control of the computer system to the master boot record, when the first and second cyclic redundancy check values match.

6. The computer system of claim 5 further comprising:

means for presenting an indication of virus detection to a user when the first and second cyclic redundancy check values do not match.

7. In a computer system comprising a central processor unit (CPU) for executing an operating system having an associated operating system boot record, at least one booting device, and an information storage device, a method, for detecting a computer virus during a boot sequence for a computer system, comprising the steps of:

(a) storing an identification code in the information storage device, the identification code corresponding to a selected booting device, the selected booting device including a master boot record;

(b) reading the master boot record and the operating system boot record from the device during the boot sequence;

(c) determining whether the master boot record and the operating system boot record are valid in accordance with at least one predetermined criterion; and (d) passing control of the CPU to the boot record of the device only when it is determined that the master boot record and the operating system boot record are valid.

8. The method of claim 7, further comprising the step of:

(e) in the event that the boot record of the device is not valid, presenting a message to a user indicating that the boot record of the device is not valid.

9. The method of claim 7, wherein step (c) further comprises the steps of:

(c1) storing first cyclic redundancy check values, for the selected booting device master boot record and for the selected operating system boot record, in the information storage device, the first cyclic redundancy check values having been computed at a time when it is known that neither the master boot record nor the operating system boot record were contaminated with any computer virus;

(c2) computing, during a boot sequence, second cyclic redundancy check values for the master boot record of the selected booting device and for the boot record of a selected operating system to be loaded into the computer system during boot;

(c4) comparing the first and second cyclic redundancy check values; and (c5) passing control of the computer system to the operating system boot record, when the first and second cyclic redundancy check values match.

10. The method of claim 9, wherein step (c) further comprises the step of:

(c6) presenting an indication of virus detection to a user when the first and second cyclic redundancy check values do not match.

11. A computer system comprising a system processor for executing an operating system, the operating system having an operating system boot record associated therewith; storage means, coupled to the system processor, for storing information including a master boot record for a selected booting device; detection apparatus for detecting a computer virus during a boot sequence, said detection apparatus comprising:

means for storing an identification code in the storage means, the identification code corresponding to the selected booting device; means, activated during a boot sequence and coupled to the means for storing, for reading a boot record from the device;

means, coupled to the means for reading, for determining whether the boot record is valid in accordance with at least one predetermined criterion; and means, coupled to the means for determining, for passing control of the system processor to the boot record of the device only when it is determined that the boot record of the device is valid and for presenting a message to a user indicating that the boot record of the device is not valid, in the event that the boot record of the device is not valid.

* * * * *